United States Patent
Faber

(10) Patent No.: US 8,581,745 B2
(45) Date of Patent: Nov. 12, 2013

(54) METHOD AND DEVICE FOR DETECTING A VEHICLE PASSING BY IN THE DARK

(75) Inventor: Petko Faber, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 701 days.

(21) Appl. No.: 12/336,600

(22) Filed: Dec. 17, 2008

(65) Prior Publication Data

US 2009/0184844 A1 Jul. 23, 2009

(30) Foreign Application Priority Data

Jan. 21, 2008 (DE) .......................... 10 2008 005 314

(51) Int. Cl.
*G08G 1/16* (2006.01)

(52) U.S. Cl.
USPC ........... 340/903; 340/901; 340/435; 340/436; 340/426.24; 340/426.23; 340/463; 348/148

(58) Field of Classification Search
USPC .................. 340/901, 903, 435, 436, 426.23, 340/426.24, 463; 348/148
See application file for complete search history.

(56) References Cited

U.S. PATENT DOCUMENTS

| | | | | |
|---|---|---|---|---|
| 2,771,594 A | * | 11/1956 | Gourdou | 340/902 |
| 3,192,437 A | * | 6/1965 | Meyer | 315/77 |
| 3,601,792 A | * | 8/1971 | Murray | 340/903 |
| 4,912,454 A | * | 3/1990 | Solow | 340/472 |
| 6,016,035 A | * | 1/2000 | Eberspacher et al. | 315/82 |
| 6,223,117 B1 | * | 4/2001 | Labuhn et al. | 701/93 |
| 6,744,380 B2 | * | 6/2004 | Imanishi et al. | 340/937 |
| 6,803,858 B2 | * | 10/2004 | Whitted | 340/903 |
| 6,919,796 B2 | * | 7/2005 | Boddy et al. | 340/425.5 |
| 7,439,507 B2 | * | 10/2008 | Deasy et al. | 250/338.1 |
| 7,444,241 B2 | * | 10/2008 | Grimm | 701/301 |
| 7,679,530 B2 | * | 3/2010 | Waquet | 340/984 |
| 7,720,580 B2 | * | 5/2010 | Higgins-Luthman | 701/28 |
| 8,004,394 B2 | * | 8/2011 | Englander | 340/433 |
| 2004/0143380 A1 | * | 7/2004 | Stam et al. | 701/36 |
| 2005/0134440 A1 | * | 6/2005 | Breed | 340/435 |
| 2008/0062010 A1 | | 3/2008 | Kobayashi et al. | |
| 2008/0088481 A1 | | 4/2008 | Kumon et al. | |

FOREIGN PATENT DOCUMENTS

| | | |
|---|---|---|
| DE | 10 2004 013 818 | 10/2005 |
| DE | 10 2007 018 599 | 10/2007 |
| DE | 10 2007 048 508 | 4/2008 |
| EP | 1 513 103 | 3/2005 |
| EP | 1 837 803 | 9/2007 |
| JP | 6-276524 | 9/1994 |
| WO | WO 2008/096234 | 8/2008 |

* cited by examiner

*Primary Examiner* — George Bugg
*Assistant Examiner* — Naomi Small
(74) *Attorney, Agent, or Firm* — Kenyon & Kenyon LLP

(57) ABSTRACT

A device for detecting a vehicle passing by a vehicle in the dark. A camera detects a light cone that is moving at a lateral offset relative to the vehicle. An analyzer device assigns the relatively moving light cone to the passing vehicle.

8 Claims, 4 Drawing Sheets

METHOD AND DEVICE FOR DETECTING A VEHICLE PASSING BY IN THE DARK

FIELD OF THE INVENTION

The present invention relates to a method for detecting a vehicle passing by in the dark, in particular a vehicle passing a vehicle. The present invention also relates to a device for carrying out a method for detecting a vehicle passing by in the dark.

BACKGROUND INFORMATION

Motor vehicles are being equipped in increasing measure with driver assistance systems that support the driver in driving a motor vehicle. A driver assistance system described in German Patent Application No. DE 10 2004 013 818 recognizes maneuvers in which other vehicles pull into and out of the lane, so that the assistance system can respond in good time. Here vehicles in adjacent lanes are constantly monitored to determine whether they are entering the lane of the host vehicle or have left it. To that end, an image processing system recognizes vehicles traveling ahead of the vehicle.

SUMMARY OF THE INVENTION

The method according to the present invention is able to detect another vehicle passing by a vehicle in the dark, in particular another vehicle passing a vehicle, having the following steps: detecting a light cone that is moving relative to the vehicle in a zone to the side of the vehicle, and assigning the relatively moving light cone to the other passing vehicle.

The method circumvents problems of low contrast between a vehicle body and the surroundings in the dark.

The present invention also relates to a device for detecting a vehicle passing by a vehicle in the dark, in particular a device for detecting another vehicle passing a vehicle in the dark. A camera detects a light cone that is moving at a lateral offset relative to the vehicle. An analyzer device assigns the relatively moving light cone to the passing vehicle.

The method and device according to the present invention have the advantage that passing vehicles are detected early specifically when it is dark, in particular earlier than when detecting taillights. This contributes in a beneficial manner to the early recognition of critical traffic situations.

DETAILED DESCRIPTION

Figure 1:
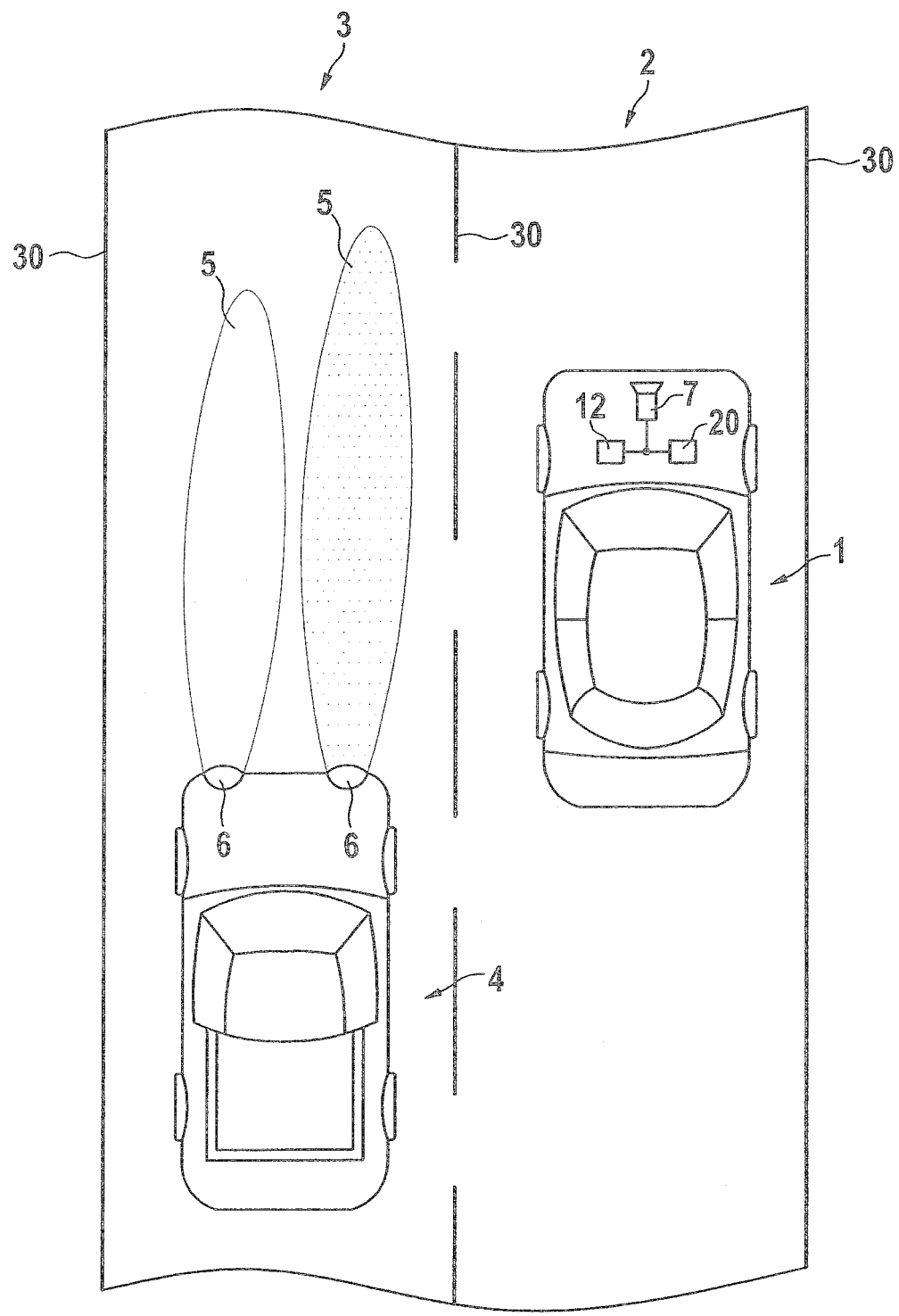
FIG. 1 shows a specific embodiment in an exemplary traffic situation.

FIG. 1 shows a vehicle 1 in a traffic lane 2. Traffic lane 2 is typically indicated by a lane marking 30. In conjunction with the present invention, traffic lane 2 may also designate the trajectory of vehicle 1.

Adjacent to lane 2 of vehicle 1 is another lane 3 in which another vehicle 4 may move. In the traffic situation depicted by way of example in FIG. 1, other vehicle 4 is passing vehicle 1 on the left side. Other lane 3, like lane 2, may be defined by lane markings. The possibility also exists, however, that the other vehicle leaves the road to pass. In general, other lane 3 designates the trajectory of other vehicle 4.

Headlights 6 of other vehicle 4 are switched on when it is dark. Light cones 5 from headlights 6 illuminate other lane 3 out to a predefined distance. The predefined distance is conditioned on the design of headlights 6, and is typically established by traffic regulations and laws and is therefore known.

Vehicle 1 has a camera 7. Camera 7 is set up to detect a traffic situation ahead of vehicle 1. Camera 7 detects both lane 2, in which vehicle 1 is traveling, and at least adjacent lane 3 immediately to the left. In one embodiment, camera 7 also detects the adjacent lane to the right.

Figure 2:
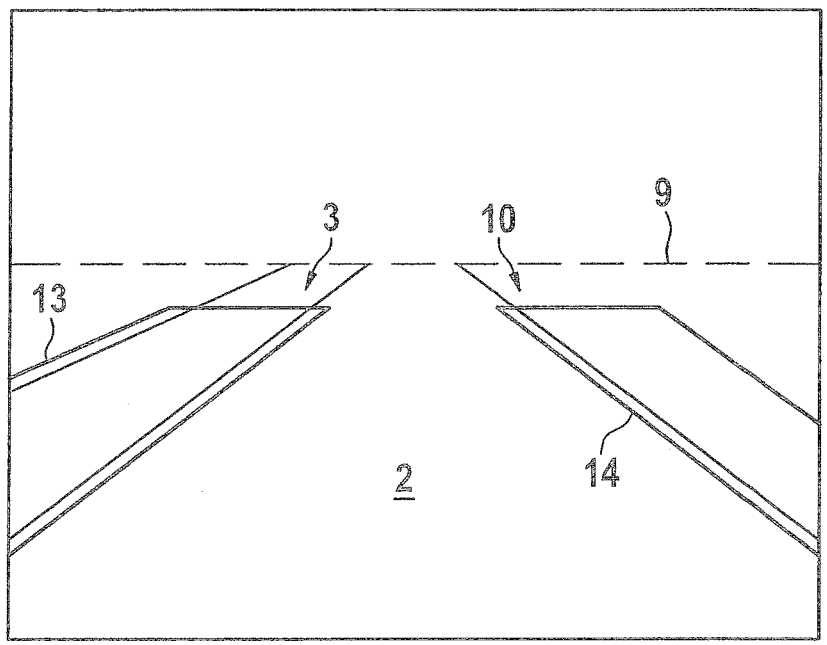
FIG. 2 shows a camera view to illustrate a specific embodiment.

FIG. 2 shows an example of an image that is recorded by camera 7. Lane 2, other adjacent lane 3 on the left, and here by way of example also adjacent lane 10 on the right are detected out to a horizon 9.

An analyzer device 12 detects changes in a lateral zone 13. Lateral zone 13 may cover lane 3 to the left adjacent to lane 2 of vehicle 1. In one embodiment, lateral zone 13 is limited to the area located ahead of vehicle 1. Furthermore, lateral zone 13 may be limited to a predefined distance. The predefined distance may correspond to the range of light cones 5 of other typically expected vehicles 4. The range of light cone 5 may be assumed for a low-cone light or a high-cone light.

In addition to left lateral zone 13, analyzer device 12 may also detect changes in a right lateral zone 14. The arrangement of right lateral zone 14 may be mirror-symmetrical to left lateral zone 13.

Lateral zones 13, 14 may be realized by masking the other elements of the image. The possibility also exists of setting up camera 7 physically to correspond to the desired lateral zone 13, so that only the latter is recorded.

A method for detecting another passing vehicle 4 will be described below. The method may also be modified for a vehicle 4 approaching from the front.

Camera 7 detects the area ahead of vehicle 1 with localized resolution. The rastered image with light intensity values is fed to analyzer device 12.

A darkness adjustment may be performed for the rastered image. The adjustment may be made by subtracting a stored dark frame. The dark frame may show a standardized traffic lane that is illuminated by the headlights of the vehicle. Other vehicles, in particular in the left and right lanes, are not recorded in the dark frame. The dark frame may be recorded once, for example at the factory, or for each trip, or at regular intervals when it is dark.

Figure 3:
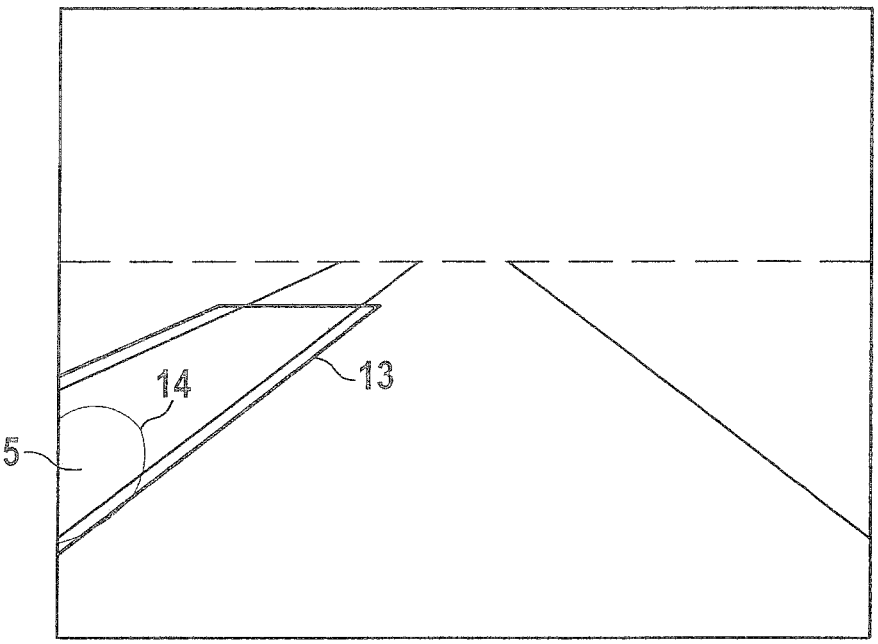
FIGS. 3 through 6 show camera views to illustrate a method for detecting an overtaking vehicle.

FIG. 3 shows a light cone 5 of a headlight 6 appearing in left lateral zone 13.

Analyzer device 12 detects a rise in light intensity (brightness) in lateral zone 13 of the rastered image. A threshold value device 20 may be provided for this purpose, which responds when a threshold value is exceeded by a light intensity value. The rastered image may be quantified into binary values by threshold value device 20. A boundary zone 14 of the transition from light to dark may be ascertained through differentiation of the quantified image.

Analyzer device 12 determines whether the rise occurs within zone 14, close to the vehicle, of lateral zone 13, or equivalently whether boundary zone 14 lies in zone 13 close to the vehicle.

Figure 4:
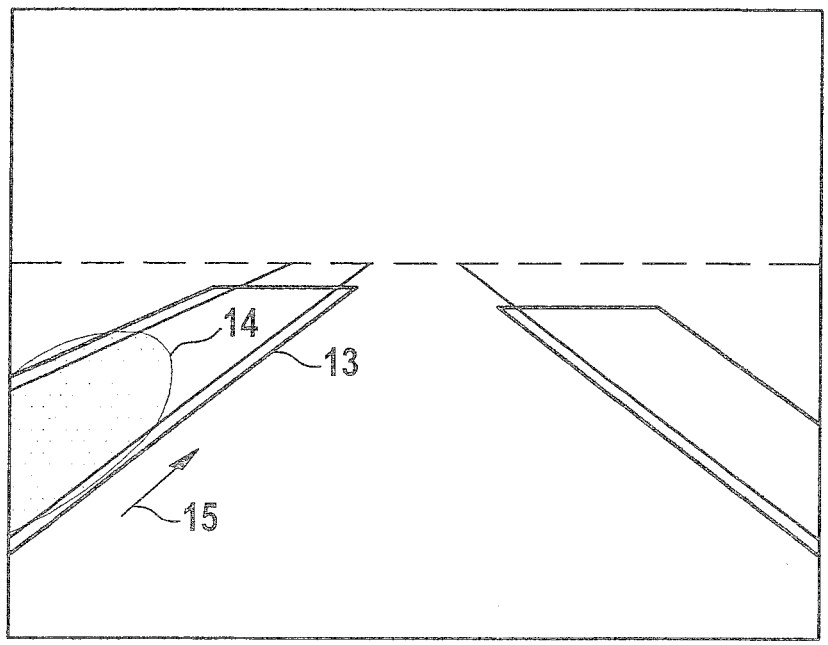

If so, analyzer device 12 follows the direction of motion of boundary zone 14 in lateral zone 13. In the situation depicted in FIG. 4 it is detected that boundary zone 14 is moving parallel to direction of travel 15. Analyzer device 12 assigns boundary zone 14 to a light cone 5 of a passing vehicle 4 based on the direction of motion.

Based on the motion of boundary zone 14 in the rastered image, analyzer device 12 is also able to determine the relative velocity of the passing vehicle. Based on a known range of light cones 5 of headlights 6, analyzer device 12 is also able to estimate the moment at which the passing operation will be completed.

Figure 5:
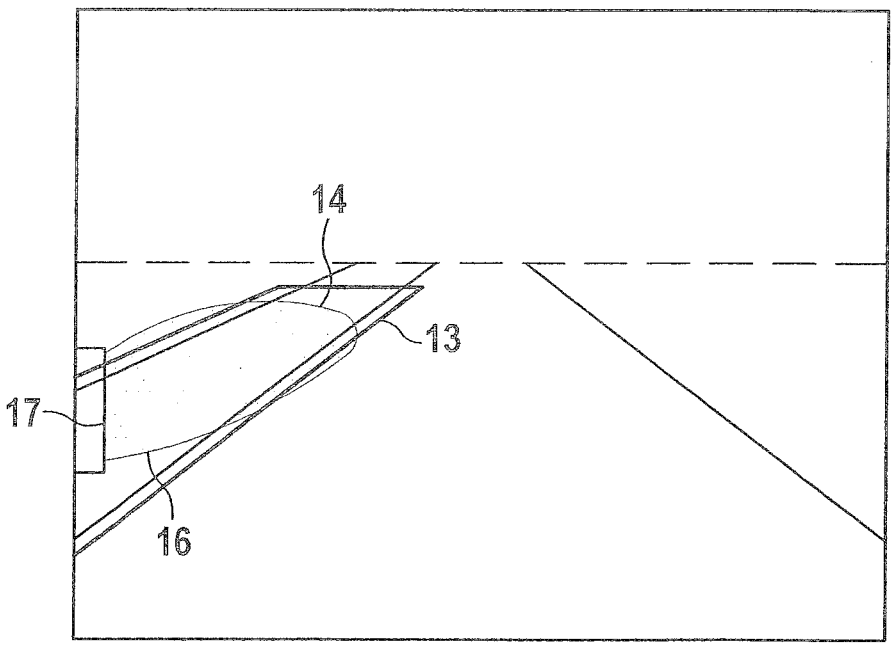

FIG. 5 shows a traffic situation where passing vehicle 4 is traveling beside vehicle 1 or has traveled partway past vehicle 1.

Analyzer device 12 detects a decrease in light intensity below a threshold value in an area of lateral zone 13 close to the vehicle. Boundary zone 16 of decreasing intensity is assigned to a beginning of light cone 5, which is not hitting the roadway. The headlights of the passing vehicle are now not far away from the front part of vehicle 1 that is being passed. When analyzer device 12 detects a decrease in intensity, it may emit a signal which indicates that the passing vehicle is located at least partially beside vehicle 1 which is being passed.

Analyzer device 12 ascertains the occurrence of a high-contrast transition from light to dark in boundary zone 13 close to the vehicle. Analyzer device 12 assigns the occurrence of the high-contrast transition to front part 17 of passing vehicle 4.

If the high-contrast transition, i.e., the depicted front part 17, moves away past a threshold 19 in the image, analyzer device 12 may issue a signal which indicates that passing vehicle 4 has passed vehicle 1.

Figure 6:
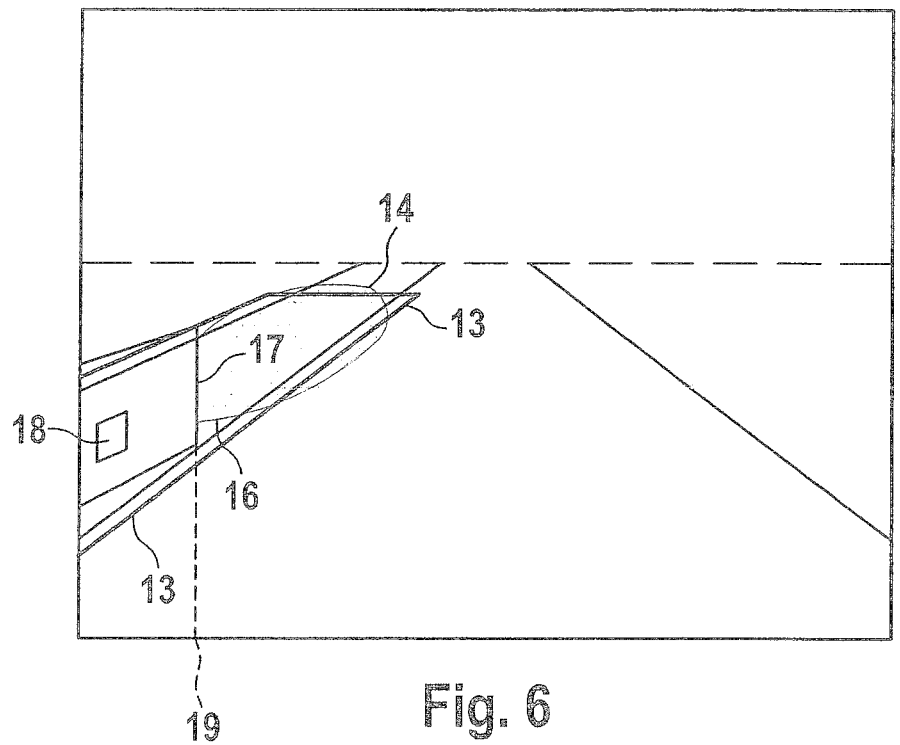

An alternative embodiment ascertains the occurrence of taillights 18 in the image (FIG. 6). Taillights 18 appear as bright, locally bounded elements in lateral zone 13. If analyzer device 12 detects taillights 18, it may issue a signal that passing vehicle 4 has passed vehicle 1.

Analyzer device 12 may analyze right boundary zone 14 in the same manner. In particular in city traffic, passing vehicles may be expected on both sides.

The signals issued by analyzer device 12 may be fed to a driver assistance system and/or predictive safety systems (PSS). Responding to the signals, the systems may partially or completely take over control of the vehicle, or may call the attention of the driver to a dangerous situation by suitable means.

Oncoming vehicles may be detected analogously by the described method. In addition, it is possible to detect when they are beside the vehicle. In a first variant, cameras are mounted on the rear of the vehicle for that purpose. The analysis is performed as described above.

In another embodiment, first a rise in light intensity is detected in an area of boundary zone 13 far from the vehicle. The boundary zone approaches the vehicle. Analyzer device 12 is able to estimate the relative velocity from this. When the intensity in the zone near the vehicle decreases again, headlights 6 of oncoming vehicle 4 are passing vehicle 1. Analyzer device 12 is able to detect this and issue a corresponding signal. Based on the estimated relative velocity and the typical dimensions of vehicles, analyzer device 12 is able to ascertain the moment at which the two vehicles have completely passed each other.

A plausibility check may be performed by evaluating the trajectory of the host vehicle and/or the roadway markings.

What is claimed is:

1. A method for detecting a second overtaking vehicle passing by a first vehicle in the dark, the first and second vehicles traveling in substantially the same direction, the method comprising:
   detecting at least a portion of a light cone that is emitted from the second vehicle, the portion moving at a lateral offset relative to the first vehicle and being positioned ahead of the first vehicle, with respect to a direction of travel of the first vehicle, using a camera that is mounted on the first vehicle; and
   assigning the relatively moving light cone to the second overtaking vehicle by an analyzer device;
   wherein:
      the camera detects the light cone in a lateral zone that is located ahead of the first vehicle outside of a traffic lane of the first vehicle; and
      after an increase in a light intensity, the analyzer device detects a decrease in the light intensity below a threshold value in an area of the lateral zone close to the first vehicle, and, in response thereto, issues a signal which indicates that the second vehicle is at least partially beside the first vehicle.

2. The method according to claim 1, wherein the analyzer device assigns an increase in light intensity in an area of the lateral zone close to the first vehicle to the light cone of the second vehicle which is in the process of passing.

3. The method according to claim 1, wherein the analyzer device determines a boundary zone in which a light intensity increases above a threshold value, detects a shift in the boundary zone over time, and assigns the shift to a movement of the light cone of the second vehicle.

4. The method according to claim 3, wherein the analyzer device estimates a velocity of the second vehicle based on the shift in the boundary zone.

5. The method according to claim 1, wherein the camera detects taillights of the second vehicle, and in response thereto the analyzer device issues a signal which indicates that the second vehicle has passed the first vehicle.

6. A device for detecting a second overtaking vehicle passing by a first vehicle in the dark, the first and second vehicles traveling in substantially the same direction, the device comprising:
   a camera that is mounted on the first vehicle for detecting at least a portion of a light cone that is emitted from the second vehicle, the portion moving at a lateral offset relative to the first vehicle and being positioned ahead of the first vehicle, with respect to a direction of travel of the first vehicle; and
   an analyzer device for assigning the relatively moving light cone to the second overtaking vehicle;
   wherein:
      the camera detects the light cone in a lateral zone that is located ahead of the first vehicle outside of a traffic lane of the first vehicle, and
      after an increase in a light intensity, the analyzer device detects a decrease in the light intensity below a threshold value in an area of the lateral zone close to the first vehicle, and, in response thereto, issues a signal which indicates that the second vehicle is at least partially beside the first vehicle.

7. The method of claim 1, wherein the detecting includes detecting a boundary zone, and wherein the boundary zone includes binary values obtained by comparing light intensity against a threshold value.

8. The method of claim 1, wherein:
   a front end of the second vehicle, with respect to a traveling direction of the second vehicle, lies in a first plane that is (a) perpendicular to a longitudinal axis of the second vehicle and (b) behind a second plane;
   a front end of the first vehicle, with respect to a traveling direction of the first vehicle, lies in the second plane; and the second plane is perpendicular to a longitudinal axis of the first vehicle.

* * * * *